United States Patent [19]

Motozawa

[11] Patent Number: 4,932,722

[45] Date of Patent: Jun. 12, 1990

[54] SEAT BELT TIGHTENING SYSTEM INCORPORATED WITH A VEHICLE SEAT

[75] Inventor: Yasuki Motozawa, Saitama, Japan

[73] Assignee: Honda, Giken, Kogyo Kabushiki Kaisha, Tokyo, Japan

[21] Appl. No.: 358,025

[22] Filed: May 30, 1989

[30] Foreign Application Priority Data

Jun. 17, 1988 [JP] Japan .............................. 63-80393[U]

[51] Int. Cl.⁵ ............................................. B60R 21/10
[52] U.S. Cl. ..................................... 297/480; 297/478
[58] Field of Search ................ 297/480, 478; 280/806; 242/107.2

[56] References Cited

U.S. PATENT DOCUMENTS

| | | | |
|---|---|---|---|
| 2,708,966 | 5/1955 | Davis | 297/480 |
| 3,879,054 | 4/1975 | Lindblad | 297/480 |
| 3,891,271 | 6/1975 | Fieni | 297/480 |
| 4,412,691 | 11/1983 | Murphy et al. | 297/478 |
| 4,447,017 | 5/1984 | Inukai | 297/480 |
| 4,579,294 | 4/1986 | Sakakibara | 280/806 |
| 4,834,425 | 5/1989 | Kawai | 280/806 |

Primary Examiner—Francis K. Zugel
Attorney, Agent, or Firm—Armstrong, Nikaido, Marmelstein, Kubovcik & Murray

[57] ABSTRACT

A seat belt tightening system incorporated with a vehicle seat, comprising: a deceleration sensor for detecting deceleration indicative of occurence of a vehicle crash; a tensioning unit for tensioning a seat belt; a power unit for activating the tensioning unit upon receiving an output signal from the deceleration sensor; a safety catch member for preventing activation of the power unit; and mounted state detecting unit for detecting a mounted state of the vehicle seat and releasing the safety catch member only when it has detected the mounted state of the vehicle seat. Thus, the seat belt tightening system may be safely incorporated with the vehicle seat as a subassembly for improved efficiency of the assembling process, and the inadvertent activation of the system is positively prevented. In particular, when an explosive element is used as a part of the seat belt tightening system, it can be place conveniently inside the seat cushion of the vehicle seat without unduly complicating the assembly process for the seat belt tightening system.

6 Claims, 5 Drawing Sheets

SEAT BELT TIGHTENING SYSTEM INCORPORATED WITH A VEHICLE SEAT

TECHNICAL FIELD

The present invention relates to a seat belt tightening system for tensioning a seat belt upon detection of a vehicle crash, and in particular to such a seat belt tightening system which is adapted to be incorporated with a vehicle seat as a sub-assembly for the convenience of the assembly process.

BACKGROUND OF THE INVENTION

The injuries inflicted upon a vehicle occupant in case of a vehicle crash may be classified into those due to the primary impact resulting from the collision of the vehicle with a roadside object or another vehicle and those resulting from the secondary impact due to the collision of the vehicle occupant with an on-board structure. To prevent such secondary impacts, there have been proposed various seat belt tightening systems for improving the restraining capability of the seat belts in regards to the vehicle occupants by imparting a thrust to a piston received in a cylinder in response to a signal from a sensor for detecting the deceleration at the time of a vehicle crash and rapidly winding up the seat belt with this thrust, and examples of such seat belt tightening systems for preventing forward movement of the vehicle occupant is disclosed in copending U.S. patent applications Ser. No. 07/030,630 filed Mar. 27, 1987 (European patent application No. 87.302842.9) and Ser. No. 07/132,257 filed Dec. 14, 1987 which are incorporated herein by reference.

To simplify the assembly process for such a seat belt tightening system, it is desirable to be able to construct it as a sub-assembly as long as the total mass thereof is kept within a certain limit.

However, if a seat belt tightening system incorporating a deceleration sensor is constructed as a part of a sub-assembly which includes the vehicle seat and the seat belt tightening device, there is a risk of inadvertently activating the seat belt tightening system if an excessive impact is applied to the subassembly during its transportation or at the time of mounting the seat on a vehicle body. Therefore, a considerable care will be required in the handling of the sub-assembly, and it will reduce the efficiency of the assembly work.

BRIEF SUMMARY OF THE INVENTION

The present invention was made in view of such problems of the prior art, and its primary object is to provide a seat belt tightening system which may be integrally attached to a vehicle seat as a part of a sub-assembly but is free from inadvertent activation thereof before the seat is mounted on a vehicle body.

A second object of the present invention is to provide a seat belt tightening system which becomes ready for activation through a mere process of mounting the vehicle seat on a vehicle body.

According to the present invention, such objects are accomplished by providing a seat belt tightening system incorporated with a vehicle seat, comprising: a deceleration sensor for detecting deceleration indicative of occurrence of a vehicle crash; a tensioning unit for tensioning a seat belt; a power unit for activating the tensioning unit upon receiving an output signal from the deceleration sensor; safety catch means for preventing activation of the power unit; and mounted state detecting means for detecting a mounted state of the vehicle seat and releasing the safety catch means only when it has detected the mounted state of the vehicle seat.

Thus, the power unit can be activated only after the vehicle seat is mounted on the vehicle body. Therefore, it is possible to prevent the inadvertent activation of the seat belt tightening system even during transportation and assembly process.

According to a preferred embodiment of the present invention which is particularly advantageous because the mere process of mounting a seat on a vehicle body makes the seat belt tightening system ready for operation, the mounted state detecting means comprises a plate member pivotally supported by a mounting bracket of the vehicle seat so that the plate member may pivot away and toward the bracket, the plate member and the mounting bracket having holes for receiving a common threaded bolt therethrough; spring means urging the plate member away from the mounting bracket, coupling means for transmitting the pivotal movement of the plate member to the safety catch means so that the safety catch means may be released when the plate member has pivoted toward the mounting bracket.

If the seat is required to be adjustable, for instance, by means of slide rails, or if a certain part of the seat belt tightening system is mounted on a flexible part such as a seat cushion, it is preferred to use flexible coupling means for transmitting output from the mounted state detecting means to the safety catch means for permitting movement of the vehicle seat for adjustment and other purpose.

In order to achieve both reliability and simplicity in structure, the safety catch means should act upon the deceleration sensor. According to such a preferred embodiment, the deceleration sensor comprises an inertia mass adapted to be moved by an inertia force thereof upon detection of a deceleration indicative of a vehicle crash, and the safety catch means comprises a catch member for preventing movement of the inertia mass.

When the power unit comprises a cylinder, a piston received therein and functionally coupled with the tensioning unit, and a propellant received in the cylinder for applying a thrust to the piston, it is desired to incorporate at least a major part of the power unit into a seat cushion of the vehicle seat so that the vehicle occupant may be protected from the possible discomfort due to the activation of the propellant or other chemical agent.

DETAILED DESCRIPTION OF THE PREFERRED EMBODIMENT

Figure 1:
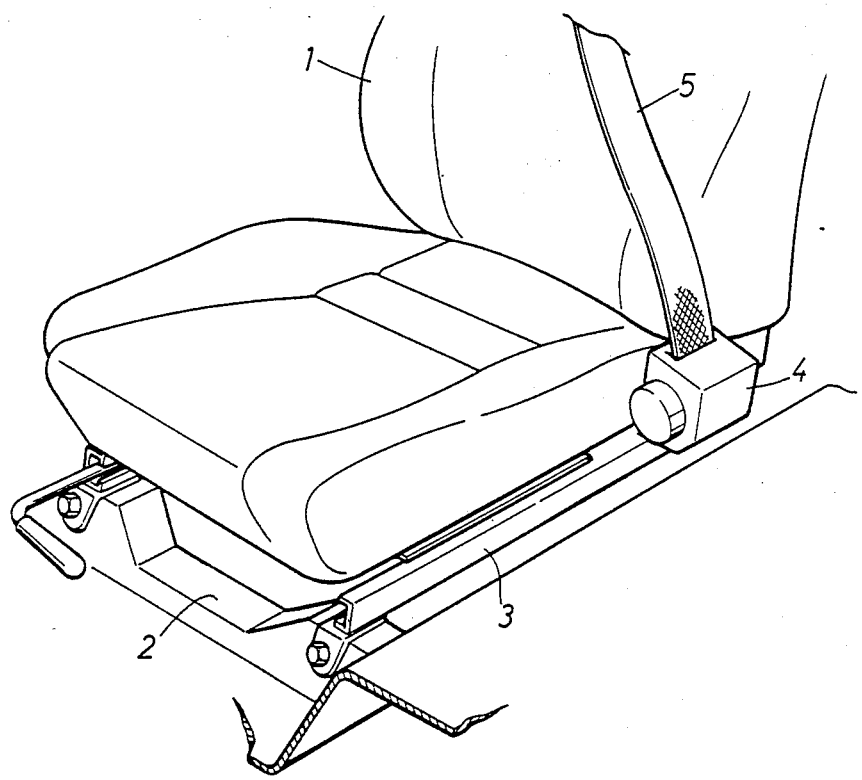
FIG. 1 is a perspective view of a seat to which the present invention is applied.

FIG. 1 shows a front seat of a vehicle to which the present invention is applied. The seat 1 is mounted on a member 2 formed in the floor panel of a vehicle body, by way of a pair of seat slide rails 3 of a known type so as to be adjusted along the longitudinal direction. To the left side of a rear part of the seat 1 is attached a seat belt tightening system 4 which is based on the present invention, and a seat belt 5 extending from this seat belt tightening system 4 is connected to a center pillar or the like at its end portion by way of a shoulder anchor not shown in the drawings.

Figure 2:
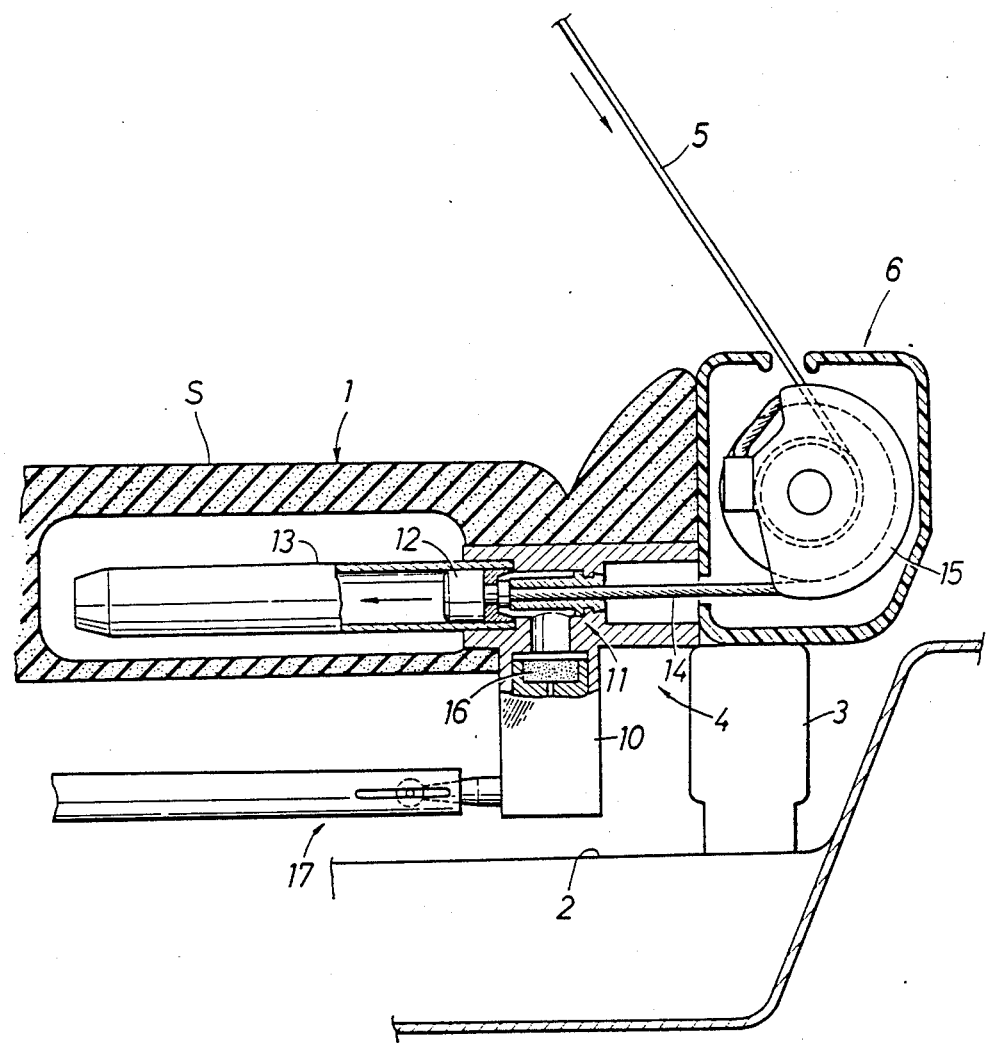
FIG. 2 is a longitudinal sectional view showing the relationship between the seat belt tightening system according to the present invention and the seat.

As shown in FIG. 2, the seat belt tightening system 4 comprises a retractor device 6 for winding up the seat belt 5, a deceleration sensor 10 for detecting the deceleration in case of a vehicle crash, and a drive device 11 for rotatively driving the retractor device 6 in response to an output signal from the deceleration sensor 10. The retractor device 6 is fixedly secured to a side of the seat 1 while the deceleration sensor 10 and the drive device are fixedly fitted into the seat cushion S as an integral subassembly unit.

The retractor device 6 is internally equipped with an emergency lock device of a known type, and permits the paying out and taking up of the seat belt 5 substantially without any constraint according to the movement of the vehicle occupant under normal condition but locks up the winding shaft so as to prohibit the pay-out of the seat belt 5 only in the case of sudden braking action.

The drive device 11 consists of a cylinder 13 laterally accommodated in the seat cushion S and slidably receiving a piston 12 therein, and a pulley 15 which is integral with the rotary shaft of the retractor device 6 and carries a wire 14 connected to the piston 12 wound thereon. Thus, when a propellant 16 received in the base end of the cylinder 13 is ignited by the output signal from the deceleration sensor 10, the wire 14 is pulled by the piston 12 which is subjected to the expansion pressure of the propellant, and the seat belt 5 is thereby wound on the reel of the retractor device 6 which is integral with the rotating pulley 15 so that the seat belt 5 may be rapidly tensioned so as to better restrain the vehicle occupant when an impulsive deceleration exceeding those caused by the braking device has acted upon the vehicle.

Between the above mentioned deceleration sensor 10 and the fixed bracket of one of the seat slide rails 3 is disposed a safety device 17 which is described hereinafter.

Figure 3:
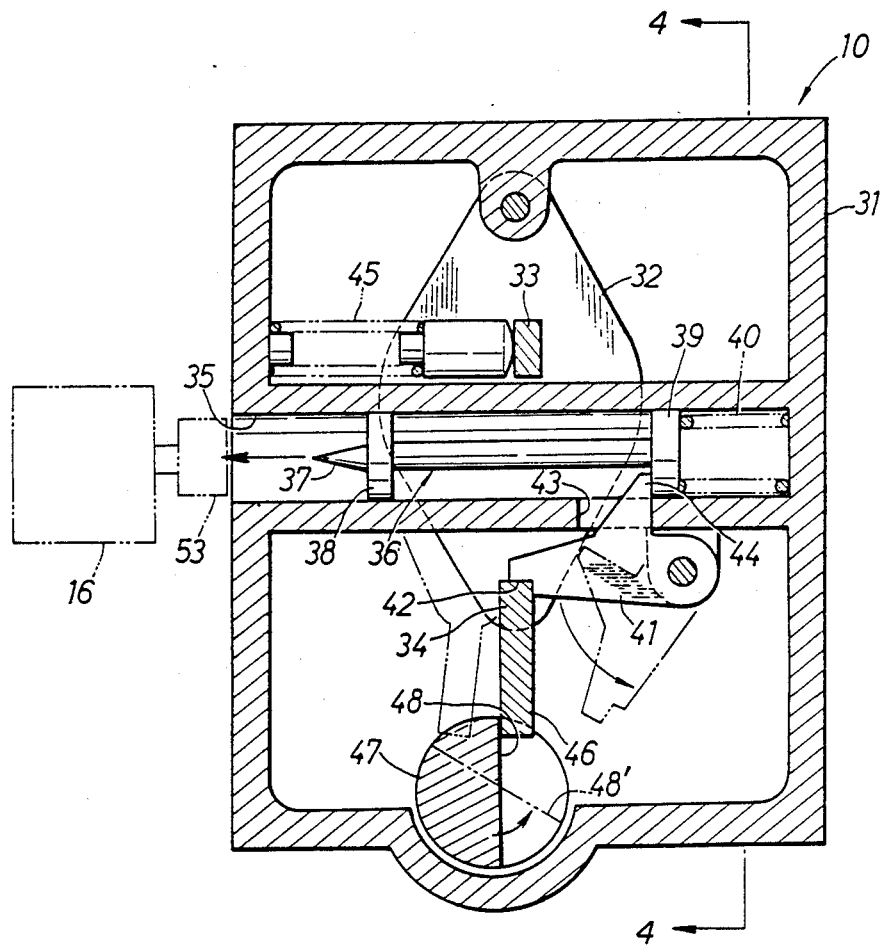
FIG. 3 is a partly broken away side view of an example of the deceleration sensor.
Figure 4:
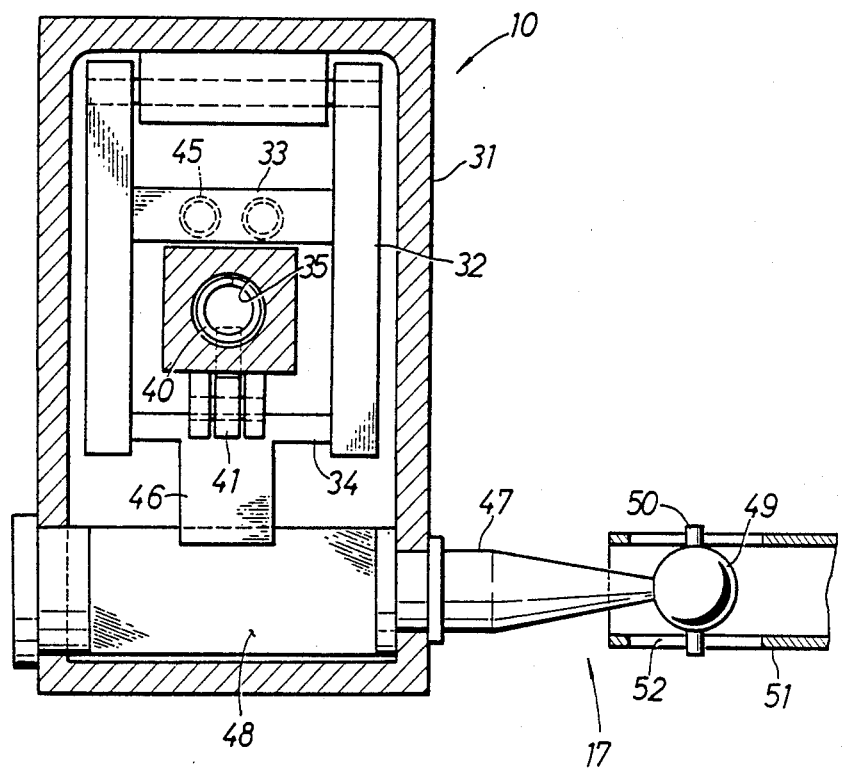
FIG. 4 is a sectional view taken along line 4—4 of FIG. 3.

FIGS. 3 and 4 show the deceleration sensor 10 in greater detail. Inside the casing 31 of the deceleration sensor 10, a pendulum 32 serving as an inertia mass is suspended at its upper end so as to be able to freely swing to and fro. The pendulum 32 consists of a pair of conformal plate members which are coupled to each other, in a mutually spaced relationship, by a pair of connecting members 33 and 34 provided at upper and lower parts of the plate members.

Between the opposing surfaces of the plate members of the pendulum 32 is disposed a part of the casing 31 having a guide bore 35 formed in the manner of a cylinder for receiving a firing pin 36 therein. This firing pin 36 is provided with a pointed front end 37, a large diameter portion 38 adapted to be slidably received in the guide bore 35, and a spring retainer 39 provided at its rear end, and is normally urged forwardly by a coil spring 40 interposed between the spring retainer 39 and the bottom wall of the guide bore 35 in a compressed state.

A trigger arm 41 substantially having the shape of inverted letter T is pivotally supported at its one end under the guide bore 35. The free end of the trigger arm 41 diametrically opposing the pivoted end thereof is provided with an engagement portion 42 which engages with the lower connecting member 34 of the pendulum 32, and an intermediate portion thereof is provided with an upward projection 44 which can project into the guide bore 35 through a slot 43 provided in a lower part of the guide bore 35 and engages with the spring retainer 39 provided in the rear end of the firing pin 36.

Now, when the firing pin 36 is inserted into the guide bore 35, compressing the coil spring 40, until the projection 44 of the trigger arm 41 is engaged with the surface of the spring retainer 39 opposing the surface abutting the coil spring 40 and the engagement portion 42 of the trigger arm 41 is engaged with the lower connecting member 34 of the pendulum 32, the firing pin 36 is retained in the guide bore 35.

A fuse 53 is provided adjacent the open front end of the guide bore 35 for igniting the propellant 16 incorporated in the drive device 11.

A pair of biasing springs 45 are interposed between the upper connecting member 33 of the pendulum 32 and the opposing inner wall of the casing 31. Thus, the pendulum 32 is always elastically urged rearwardly or in the direction to maintain the engagement between the lower connecting member 34 and the engagement portion 42.

A depending piece 46 is formed in a central portion of the lower connecting member 34 of the pendulum 32. A first rotary pin 47 of the safety device 17 projects into the casing 31 and is passed laterally across the casing immediately in front of a lower end portion of the depending piece 46. This first rotary pin 47 is pivotally supported by the side walls of the casing 31, and is provided with a smooth cut out surface 48 where it corresponds to the depending piece 46.

The external end of the first rotary pin 47 projecting from the side wall surface of the casing 31 is provided with a spherical head 49 which is in turn provided with an engagement pin 50 press fitted laterally and diametrically across the spherical head 49. This spherical head 49 is loosely received in an end of a connecting tube 51, and the engagement pin 50 is engaged with a pair slots 52 provided at diametrically opposed position of an end of the connecting tube along the longitudinal direction.

Figure 5:
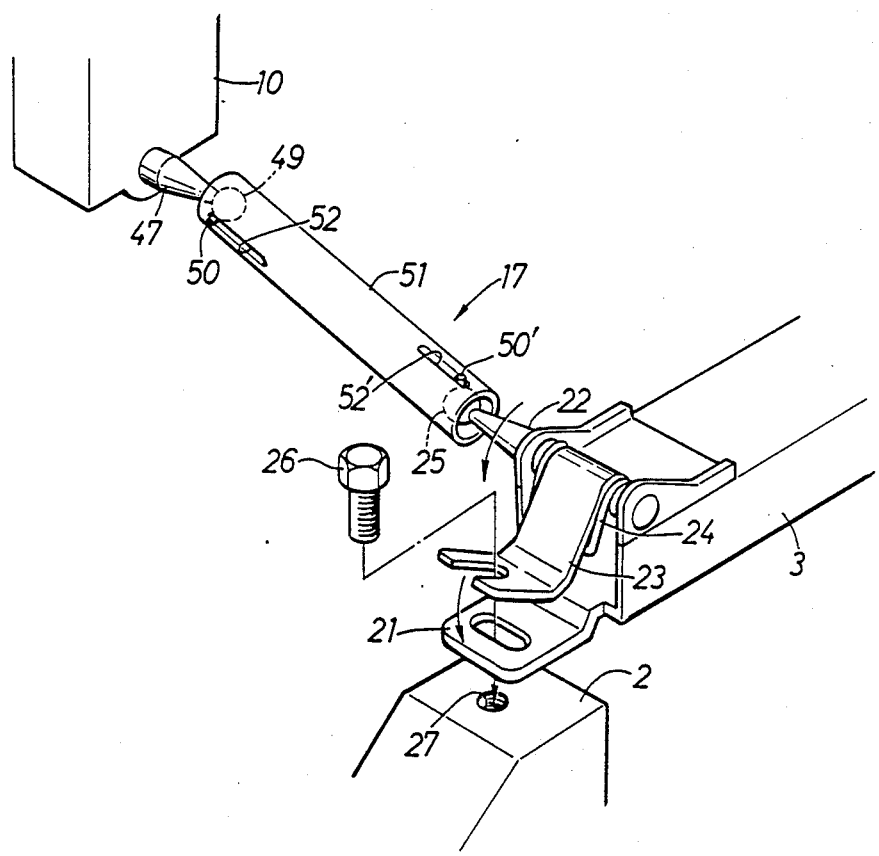
FIG. 5 is a perspective view of the safety device according to the present invention.

Meanwhile, as shown in FIG. 5, to a mounting bracket 21 at a rear end portion of one of the seat slide rails 3 is pivotally attached a moveable piece 23 via a second rotary pin 22 which is pivotally supported by the seat slide rail 3 and fixedly secured to the moveable piece 23. This moveable piece 23 can be laid over the bolt mounting surface of the bracket 21, and is always urged away from the bracket 21 by a torsion spring 24 surrounding the second rotary pin 22.

The external end portion of the second rotary pin 22 is provided with a spherical head 25 similar to that of the first rotary pin 47, and is likewise engaged with the other end of the connecting tube 51 via slots 52' and an engagement pin 50'. Thus, even when the deceleration sensor 10 has moved relative to the seat slide rail 3, the first and second rotary pins 47 and 22 can rotate in synchronism.

Now the operation of the above described embodiment is described in the following.

In mounting the seat 1 on the member 2 by way of the seat slide rail 3, the moveable piece 23 and the mounting bracket 21 are secured by the same fastening means or a threaded bolt 26. When the bolt 26 is threaded into an anchor hole 27 of the member 2, the moveable piece 23 is rotated downwardly against the biasing force of the torsion spring 24 and eventually abuts the mounting bracket 21. Thereby, the second rotary pin 22 rotates integrally with the moveable piece 23, and turns the first rotary pin 47 of the deceleration sensor 10 via the connecting tube 51. As a result, the cut out surface 48 which has been abutting the depending piece 46 at its vertical position now inclines towards the position indicated by the imaginary line 48' in FIG. 3, and the first rotary pin 47 is moved away from the depending piece 46 so as not to interfere with the latter.

In this way, before mounting the seat 1 to the vehicle body, the moveable piece 23 and the deceleration sensor 10 cooperate each other so as to prevent the movement of the pendulum 32, but the safety device 17 is automatically deactivated by mounting the seat 1 on the vehicle body.

When a vehicle crash has occurred and has produced a deceleration having a level higher than a certain prescribed value in the direction of the vehicle movement, the resulting inertia force overcomes the biasing force of the biasing springs 45 and causes the pendulum 32 to rock forwardly with its lower end first. When the engagement portion 42 of the trigger arm 41 is thereby disengaged from the lower connecting member 34 of the pendulum 32, the constraint acting upon the coil spring 40 is released, and the elastic force given from the coil spring 40 propels the firing pin 36 towards the fuse 53.

When the pointed end 37 of the firing pin 36 strikes upon the fuse 53, the propellant 16 is ignited, and the resulting explosive pressure applies a thrust to the piston 12 in the drive device 11 whereby the seat belt 5 is retracted into the retractor device 6.

When an excessive impact is applied to the deceleration sensor 10 during its transportation or assembly, there is a risk of inadvertently activating the drive device 11 according to the conventional arrangement. But, by providing the safety device 17 as described above, the activation of the deceleration sensor 10 is suspended before the seat 1 is mounted on the vehicle body, and the inadvertent activation of the drive device 11 is positively prevented.

Thus, according to this present embodiment according to the present invention, since the activation of the deceleration sensor is possible only after the seat assembly including the deceleration sensor is mounted on the vehicle body, the possibility of inadvertently activating the seat belt tightening system during its transportation and assembly can be positively prevented. Therefore, the present invention can offer a significant advantage in improving its handling and simplifying quality control.

Although the present invention has been described in terms of a specific embodiment, the present invention may be implemented in various other ways without departing from the spirit of the present invention. For instance, the structure of the safety device 17 is in no way limited to the above described embodiment, but may be realized in various other modes.

What we claim is:

1. A seat belt tightening system incorporated with a vehicle seat, comprising:
   a deceleration sensor for detecting deceleration indicative of occurrence of a vehicle crash;
   a tensioning unit for tensioning a seat belt;
   a power unit for activating said tensioning unit upon receiving an output signal from said deceleration sensor;
   safety catch means for preventing activation of said power unit; and
   mounted state detecting means for detecting a mounted state of said vehicle seat and for releasing said safety catch means when said mounted state of said vehicle seat is detected.

2. A seat belt tightening system according to claim 1, wherein said mounted state detecting means comprises a plate member pivotally supported by a mounting bracket of said vehicle seat so that said plate member may pivot away and toward said bracket, said plate member and said mounting bracket having holes for receiving a common threaded bolt therethrough; spring means urging said plate member away from said mounting bracket, coupling means for transmitting said pivotal movement of said plate member to said safety catch means so that said safety catch means may be released when said plate member has pivoted toward said mounting bracket.

3. A seat belt tightening system according to claim 1, further comprising flexible coupling means for transmitting output from said mounted state detecting means to said safety catch means for permitting movement of said vehicle seat for adjustment purpose.

4. A seat belt tightening system according to claim 1, wherein said safety catch means acts upon said deceleration sensor.

5. A seat belt tightening system according to claim 1, wherein said deceleration sensor comprises an inertia mass adapted to be moved by an inertia force thereof upon detection of a deceleration indicative of a vehicle crash, and said safety catch means comprises a catch member for preventing movement of said inertia mass.

6. A seat belt tightening system according to claim 1, wherein said power unit comprises a cylinder, a piston received therein and functionally coupled with said tensioning unit, and a propellant received in said cylinder for applying a thrust to said piston, and at least a major part of said power unit is incorporated in a seat cushion of said vehicle seat.

* * * * *